(12) United States Patent
Schlegel et al.

(10) Patent No.: US 12,214,429 B2
(45) Date of Patent: Feb. 4, 2025

(54) HAND-HELD POWER TOOL WITH A MOTOR SUPPORT FOR A DRIVE MOTOR

(71) Applicant: Robert Bosch GmbH, Stuttgart (DE)

(72) Inventors: Fritz Schlegel, Stuttgart (DE); Ralf Maier, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 17/969,213

(22) Filed: Oct. 19, 2022

(65) Prior Publication Data
US 2023/0139577 A1 May 4, 2023

(30) Foreign Application Priority Data
Nov. 3, 2021 (DE) ...................... 10 2021 212 391.0

(51) Int. Cl.
*B23B 45/00* (2006.01)
*B25D 16/00* (2006.01)
(52) U.S. Cl.
CPC .......... *B23B 45/001* (2013.01); *B23B 45/008* (2013.01); *B25D 16/00* (2013.01)
(58) Field of Classification Search
CPC ...... B23B 45/001; B23B 45/008; B25D 16/00
USPC ....................................................... 173/217
See application file for complete search history.

(56) References Cited

U.S. PATENT DOCUMENTS

| 3,651,707 A | * | 3/1972 | Rees | ...................... | H02K 7/145 |
| | | | | | 74/421 A |
| 8,925,646 B2 | * | 1/2015 | Seith | ......................... | B25F 5/02 |
| | | | | | 173/217 |
| 2016/0294254 A1 | * | 10/2016 | Hara | ......................... | B26D 5/14 |

FOREIGN PATENT DOCUMENTS

DE 10 2018 109 209 A1 10/2019

* cited by examiner

*Primary Examiner* — Robert F Long
*Assistant Examiner* — Xavier A Madison
(74) *Attorney, Agent, or Firm* — Maginot, Moore & Beck LLP

(57) ABSTRACT

A hand-held power tool, in particular a hammer drill, includes a tool holder and a housing which has two housing half-shells. The hand-held power tool further includes a drive unit for driving a tool holder arranged in the housing. The drive unit includes at least one drive motor arranged in a motor support and a gear unit arranged in a gear unit housing. The motor support is connected directly to at least one of the two housing half-shells via at least one non-positive connection and at least one positive-locking connection. A relevant fastening axis is assigned to the at least one non-positive connection and to the at least one positive-locking connection. The fastening axis is arranged at right angles to and at a distance from an axis of rotation assigned to the tool holder.

17 Claims, 5 Drawing Sheets

HAND-HELD POWER TOOL WITH A MOTOR SUPPORT FOR A DRIVE MOTOR

This application claims priority under 35 U.S.C. § 119 to patent application no. DE 10 2021 212 391.0, filed on Nov. 3, 2021 in Germany, the disclosure of which is incorporated herein by reference in its entirety.

The present disclosure relates to a hand-held power tool, in particular a hammer drill, having a tool holder and a housing which has two housing half-shells, wherein a drive unit for driving a tool holder is arranged in the housing, wherein the drive unit comprises at least one drive motor arranged in a motor support and a gear unit arranged in a gear unit housing.

BACKGROUND

Such a hand-held power tool designed as a hammer drill is known from the prior art. The hand-held power tool comprises a housing which has two housing half-shells and in which a drive unit with a drive motor and a gear unit for driving a tool holder is arranged. The drive motor is arranged in a motor support and the gear unit is arranged in a gear unit housing. The motor support, the gear unit housing and the housing half-shells are connected to one another via a screw connection.

SUMMARY

The disclosure relates to a hand-held power tool, in particular a hammer drill, having a tool holder and a housing which has two housing half-shells, wherein a drive unit for driving a tool holder is arranged in the housing, and wherein the drive unit has at least one drive motor arranged in a motor support and a gear unit arranged in a gear unit housing. The motor support is connected directly to at least one of the two housing half-shells via at least one non-positive connection and at least one positive-locking connection, wherein a relevant fastening axis is assigned to the at least one non-positive connection and to the at least one positive-locking connection, said fastening axis being arranged at right angles to and at a distance from an axis of rotation assigned to the tool holder.

The disclosure thus makes it possible to provide a hand-held power tool in which the at least one non-positive connection and the at least one positive-locking connection between the motor support and at least one housing half-shell can make it possible to improve rigidity and robustness of the hand-held power tool. In addition, a reduction in installation space can be made possible.

The motor support preferably has, on its outer surface, at least one positioning opening formed along the fastening axis for the formation of the at least one positive-locking connection to the at least one of the two housing half-shells. The at least one of the two housing half-shells preferably has, on its inner side facing the motor support, at least one positioning boss arranged along the fastening axis and assigned to the positioning opening for the formation of the at least one positive-locking connection to the motor support.

The at least one positive-locking connection between the motor support and the at least one housing half-shell can thus be formed in a simple manner both on the motor support side and on the housing half-shell side.

The motor support preferably has, on its outer surface, at least one fastening rib arranged along the axis of rotation with a screw eye formed at right angles to the axis of rotation for the formation of the at least one non-positive connection to the at least one of the two housing half-shells. The at least one of the two housing half-shells preferably has, on its inner side facing the motor support, at least one screw boss arranged along the fastening axis and assigned to the screw eye for the formation of the at least one non-positive connection to the motor support.

The at least one non-positive connection between the motor support and the at least one housing half-shell can thus be formed in a simple and uncomplicated manner both on the motor support side and on the housing half-shell side.

The at least one screw boss preferably has a pressing surface against which the fastening rib is applied.

Exact positioning of the motor support can thus be made possible in a simple manner.

According to one embodiment, the two housing half-shells each have at least one screw boss with an associated pressing surface, wherein the screw bosses are designed to be complementary to one another, and wherein the motor support, in particular the fastening rib, is arranged between the two pressing surfaces and, by means of a screw, the two housing half-shells and the motor support are connected to one another.

A stable and robust connection between the motor support and the housing half-shells can thus be formed.

The motor support is preferably formed in one piece.

A compact motor support can thus be provided, as a result of which a comparatively precise concentricity of the bearing points can also be made possible. In addition, the drive motor can be arranged in the motor support before being mounted in the hand-held power tool and can be checked before installation in the hand-held power tool.

On its outer surface, the motor support preferably has at least two screw bosses oriented along the axis of rotation, the motor support being fastened to the gear unit housing via the screw bosses.

A stable and robust connection of the motor support to the gear unit housing can thus be made possible.

According to one embodiment, an intermediate flange is arranged between the motor support and the gear unit housing.

A secure and reliable arrangement of the motor support on the gear unit housing can thus be made possible.

BRIEF DESCRIPTION OF THE DRAWINGS

The disclosure is explained in more detail in the following description on the basis of exemplary embodiments illustrated in the drawings. In the drawings.

DETAILED DESCRIPTION

Figure 1:
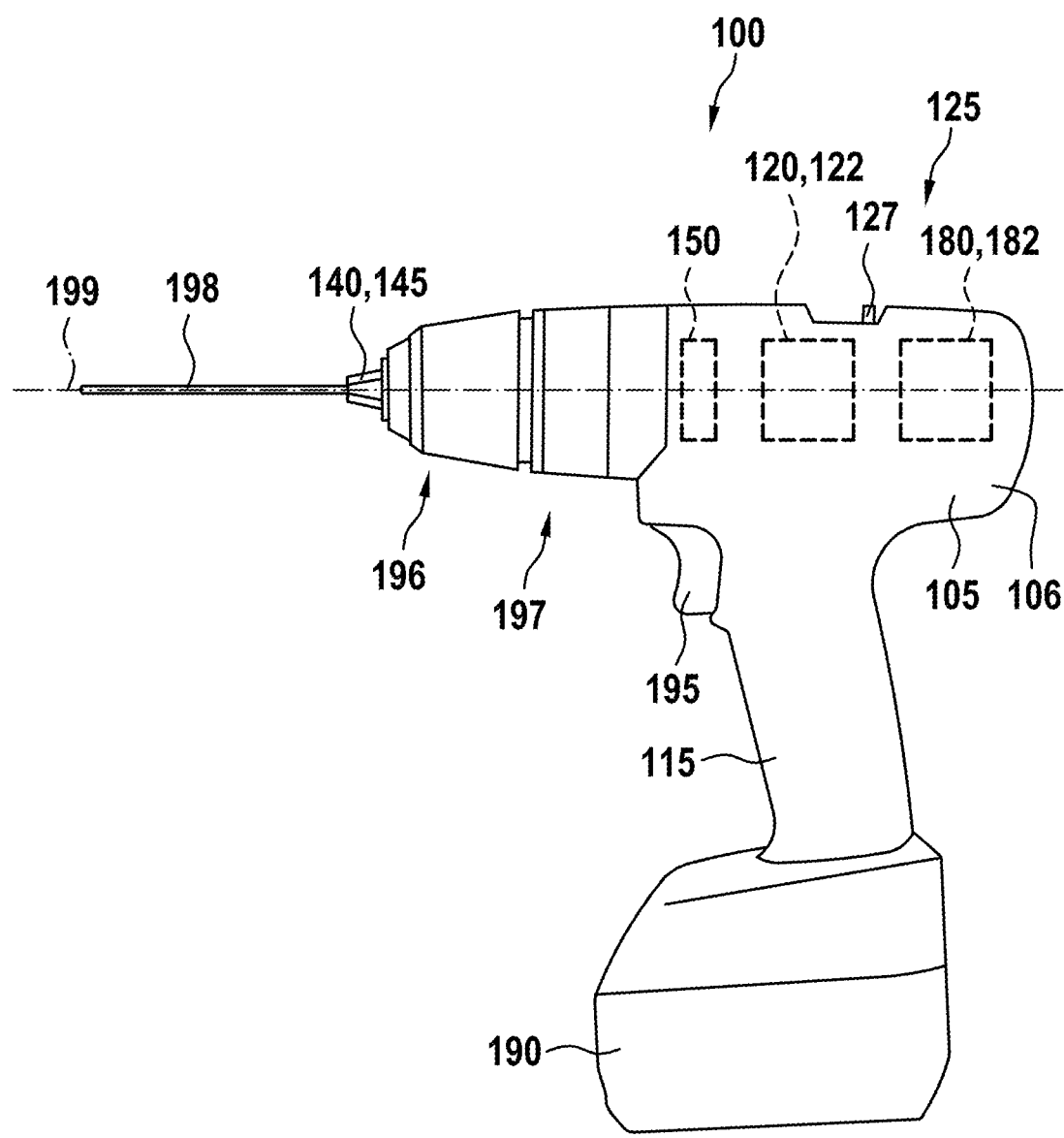
FIG. 1 is a schematic view of a hand-held power tool with a housing and a drive unit.

Elements having the same or a comparable function are provided with identical reference numerals in the figures and described in more detail only once.

FIG. 1 shows an exemplary hand-held power tool 100 with a housing 105, in which preferably a drive unit 125 for rotatingly driving a tool holder 140 is arranged. The housing 105 preferably has two housing half-shells 106. The tool holder 140 is designed illustratively for receiving an insertion tool 198 and during operation rotates about an axis of rotation 199.

In the exemplary embodiment shown, the drive unit 125 illustratively has at least one drive motor 180 and a gear unit 120. The drive motor 180 is preferably designed as an electronically commutated motor. The drive motor 180 can preferably be switched on and off via a manual switch 195, wherein the manual switch 195 is illustratively arranged on a handle 115 of the housing 105. The drive motor 180 is preferably arranged in a motor support 182. The motor support 182 is preferably formed in one piece.

The gear unit 120 is preferably designed as planetary gearing, in particular as switchable planetary gearing. The planetary gearing 120 is preferably arranged in a gear unit housing 122. An operating element 127 for manual gear-shifting by a user is preferably assigned to the planetary gearing 120. For the sake of simplicity, the planetary gearing 120, which is preferably designed as a switchable gear unit, is hereinafter referred to solely as the "gear unit 120."

Furthermore, the hand-held power tool 100 optionally has a torque adjustment device with a torque adjustment sleeve 197. Such a torque adjustment device is sufficiently known from the prior art so that a detailed description of the torque adjustment device is dispensed with here for the sake of brevity of the description.

Illustratively, for mains-independent power supply the hand-held power tool 100 is mechanically and electrically connectable to a battery pack 190, and can alternatively or additionally also be operable in a mains-dependent manner. By way of example, the hand-held power tool 100 is designed as a hammer drill or impact drill screwdriver with an impact mechanism 150. Illustratively, the tool holder 140 is designed as a drill chuck 145, which is provided by way of example with a protective sleeve 196. As an alternative to this, the tool holder 140 can however also be designed as a tool attachment, which is detachably arranged on the hand-held power tool 100.

However, the hand-held power tool 100 can also be designed, for example, as a drill driver without an impact mechanism 150. However, it is pointed out that the present disclosure is not limited to hammer drills, drill drivers or impact drill screwdrivers, but can be used generally in hand-held power tools of which the drive unit 125 has at least one drive motor arranged in a motor support and a housing formed from housing half-shells.

Figure 2:
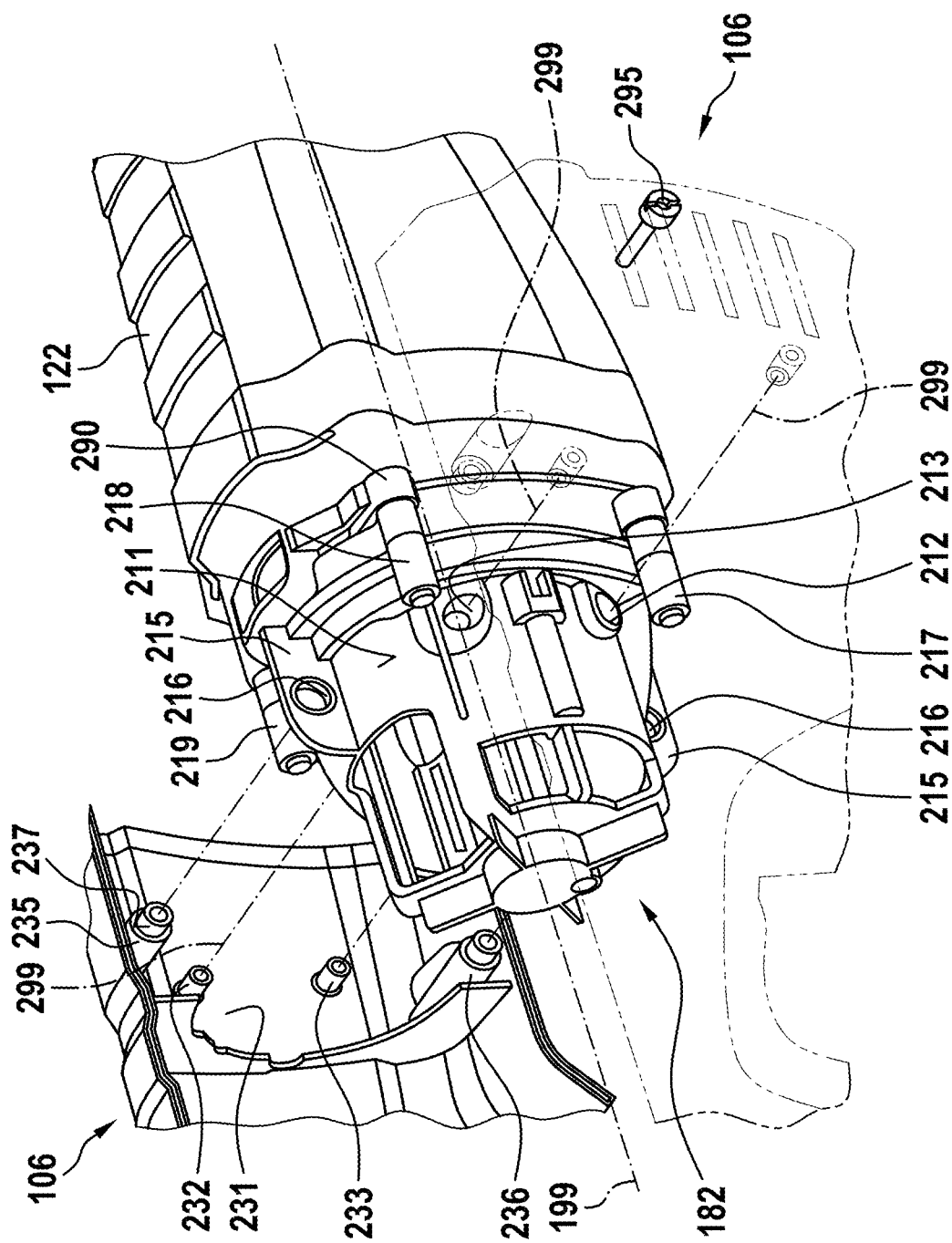
FIG. 2 is a partial exploded view of the housing and the drive unit of the hand-held power tool of FIG. 1.

FIG. 2 shows the two housing half-shells 106 of the housing 105 and the motor support 182, as well as the gear unit housing 122 of FIG. 1. The motor support 182 illustratively has an approximately cylindrical main body with an outer surface 211. The drive motor 180 of FIG. 1 can preferably be arranged in the interior of the motor support 182.

Figure 4:
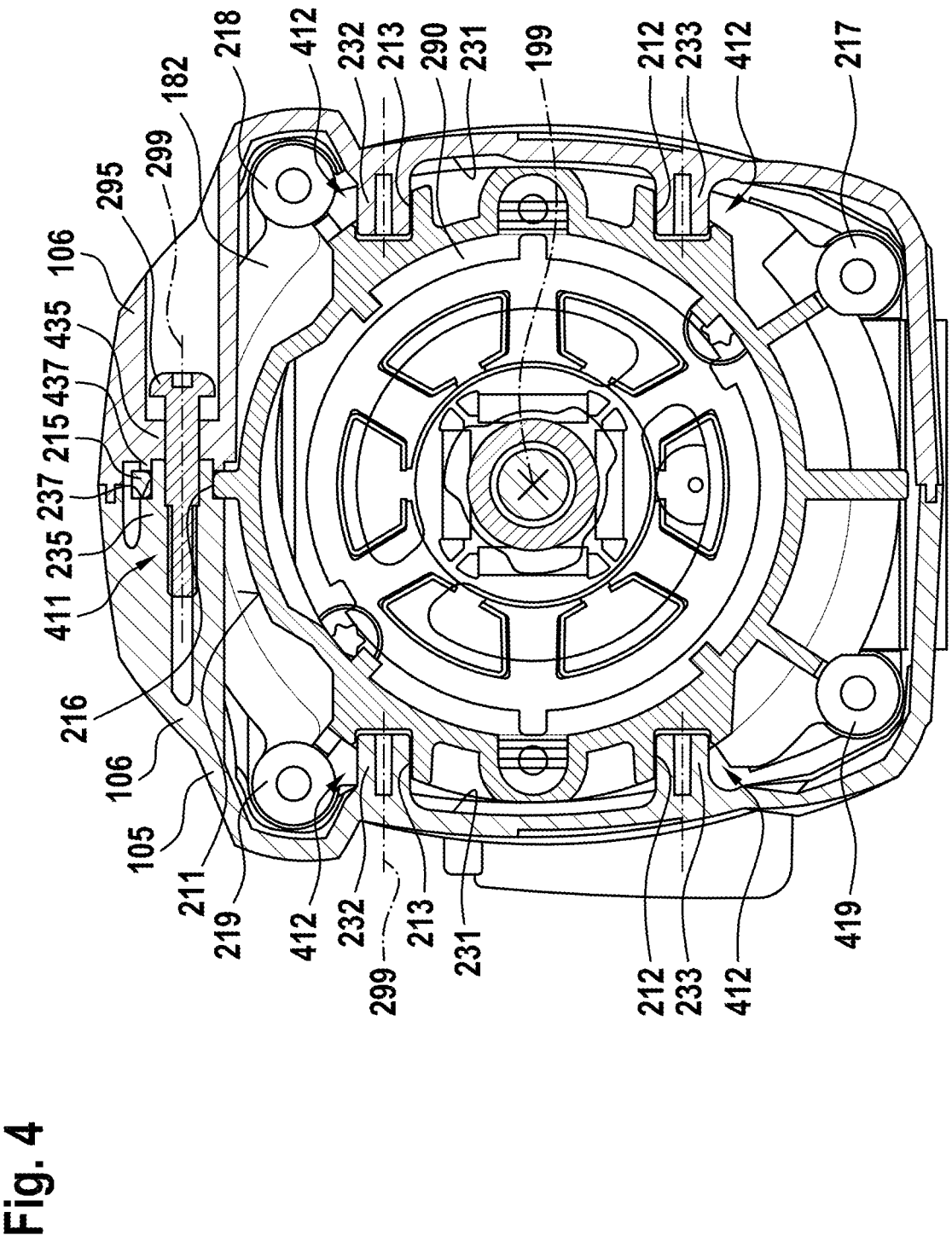
FIG. 4 is a section through the drive unit arranged in the housing of FIG. 1 to FIG. 3.

In FIG. 2, the motor support 182 is illustratively fastened to the gear unit housing 122 via screw bosses 217, 218, 219 (419 in FIG. 4). On its outer surface 211 the motor support 182 preferably has at least two, illustratively three, preferably four, screw bosses 217, 218, 219 (419 in FIG. 4) oriented along the axis of rotation 199 or along a longitudinal extension of the motor support 182. A screw connection is formed between the motor support 182 and the gear unit housing 122 via the screw bosses 217, 218, 219 (419 in FIG. 4). For this purpose, a screw (not shown) is assigned to each screw boss 217, 218, 219 (419 in FIG. 4). According to one embodiment, an intermediate flange 290 is arranged between the motor support 182 and the gear unit housing 122.

According to the disclosure, the motor support 182 is connected directly to at least one of the two housing half-shells 106 via at least one non-positive connection (411 in FIG. 4) and at least one positive-locking connection (412 in FIG. 4). Torque support can thereby be effected via the housing 105 or the housing half-shells 106. Torque support in the axial direction or along the axis of rotation 199 via the screw bosses 218, 219, (419 in FIG. 4) to the intermediate flange is thereby no longer required.

A relevant fastening axis 299 is assigned to the at least one non-positive connection (411 in FIG. 4) and to the at least one positive-locking connection (412 in FIG. 4). All corresponding fastening axes 299 are here preferably arranged at right angles to the axis of rotation 199 and at a distance from the axis of rotation 199.

For this purpose, the motor support 182 preferably has, on its outer surface 211, at least one positioning opening 212, 213 formed along the fastening axis 299. Illustratively, only two of the preferably four positioning openings 212, 213 of the motor support 182 are shown in FIG. 2. The positioning openings 212, 213 are designed to form at least one positive-locking connection (412 in FIG. 4) between the motor support 182 and at least one of the two housing half-shells 106.

Furthermore, the motor support 182 preferably has, on its outer surface 211, at least one fastening rib 215 arranged along the axis of rotation 199. Illustratively, two oppositely arranged fastening ribs 215 are shown. Each of the illustratively two fastening ribs 215 has a screw eye 216 formed at right angles to the axis of rotation 199 for the formation of the at least one non-positive connection (411 in FIG. 4) to the at least one of the two housing half-shells 106.

Similarly thereto, the at least one of the two housing half-shells 106 has, on its inner side 231 facing the motor support 182, at least one, illustratively two, positioning bosses 232, 233 arranged along the fastening axis 299 and assigned to the positioning opening 212, 213 of the motor support 182 for the formation of the at least one positive-locking connection (412) to the motor support 182. Furthermore, at least one of the two housing half-shells 106 has, on its inner side 231 facing the motor support 182, at least one screw boss 235, 236 arranged along the fastening axis 299 and assigned to the screw eye 216 for the formation of the at least one non-positive connection (411 in FIG. 4) to the motor support 182. Two screw bosses are shown illustratively, with one screw boss 235 being illustratively arranged at the top and one screw boss 236 being illustratively arranged at the bottom, on the inner side 231. In this case, a screw boss 235, 236 is assigned to each screw eye 216.

According to one embodiment, the at least one screw boss 235, 236 has a pressing surface 237 against which the fastening rib 215 of the motor support 182 is applied in the assembled state. The two housing half-shells 106 and the motor support 182 are preferably connected to one another by means of a screw 295 assigned to a screw boss 236. A screw 295 is assigned to each screw boss 235, 236.

Figure 3:
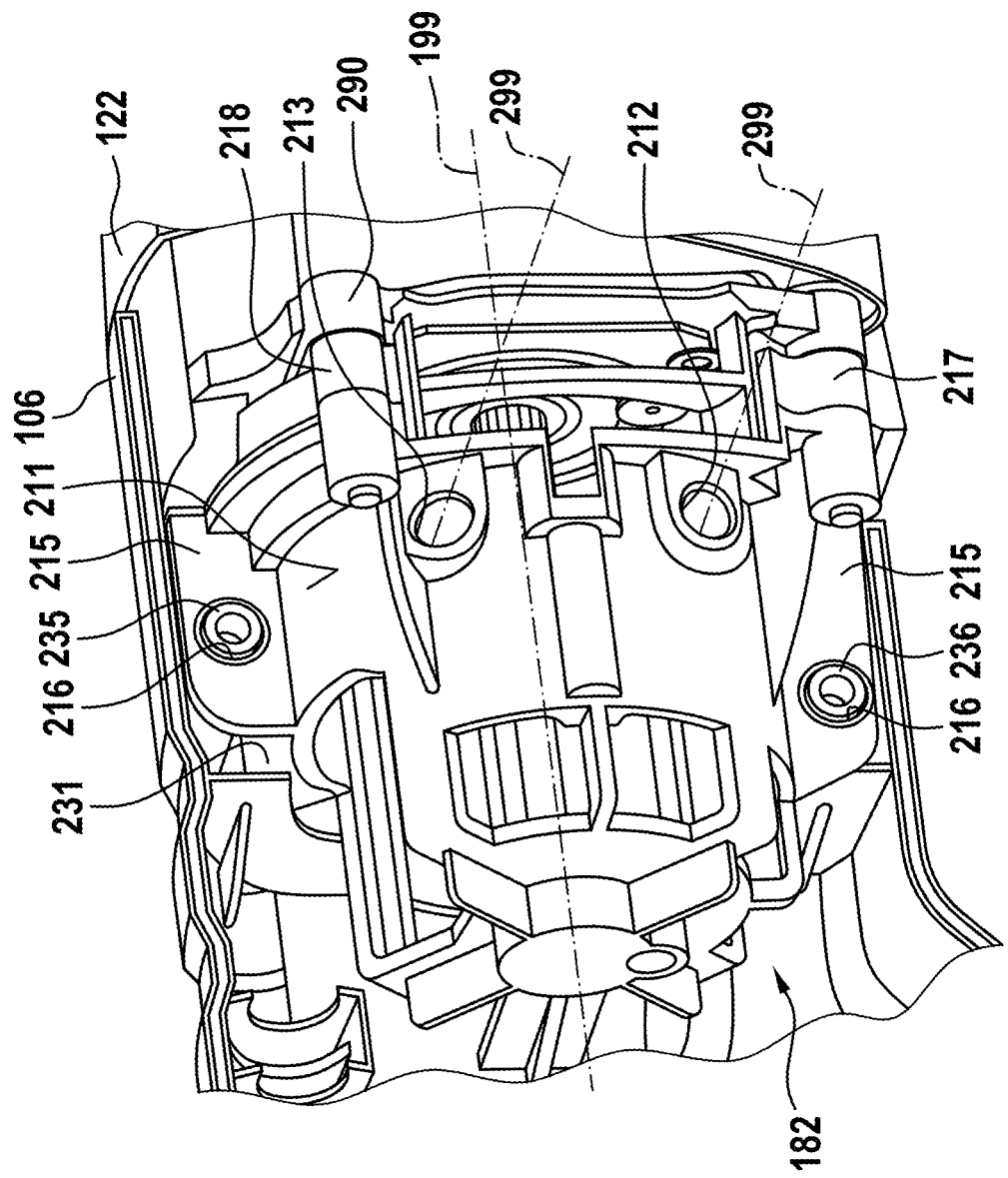
FIG. 3 is a perspective view of the drive unit of FIG. 1 and FIG. 2 with the open housing of FIG. 1 and FIG. 2.

FIG. 3 shows the motor support 182 fastened to the gear unit housing 122, which motor support has been inserted into one of the two housing half-shells 106 of the housing of FIG. 1 and FIG. 2. In this case, FIG. 3 clearly shows the arrangement of the screw bosses 235, 236 in the screw eyes 216 of the fastening ribs 215 of the motor support 182. Furthermore, FIG. 3 illustrates the arrangement of the fastening axes 299, which are preferably arranged perpendicularly or at right angles to the axis of rotation 199. It can also be seen here that the two fastening axes 299 are arranged parallel to one another and spaced apart from the axis of rotation 199.

FIG. 4 shows the motor support 182 of FIG. 1 to FIG. 3 arranged in the housing 105 or in the housing half-shells 106. FIG. 4 here illustrates the arrangement of the positioning bosses 232, 233 of the respective housing half-shells 106 in the positioning openings 212, 213 of the motor support 182 for the formation of the at least one, illustratively four, positive-locking connections 412. Furthermore, FIG. 4 illustrates the fastening axes 299 which are arranged at right angles to the axis of rotation 199 and illustratively horizontally. The positive-locking connection 412 has a comparatively small clearance along the axis of rotation 199 and along the fastening axes 299, whereby undesired wear on the positioning bosses 232, 233 and/or the positioning openings 212, 213 can be prevented.

FIG. 4 also illustrates the two housing half-shells 106, wherein the illustratively right-hand housing half-shell 106 has a screw boss 435. Preferably, the two housing half-shells 106 each have at least one screw boss 235, 435 with an associated pressing surface 237, 437, wherein the screw bosses 235, 435 are designed to be complementary to one another. Furthermore, the motor support 182, in particular the fastening rib 215, is, in the assembled state, arranged between the two pressing surfaces 237, 437.

Furthermore, FIG. 4 illustrates the at least one non-positive connection 411, which is formed between the screw bosses 235, 435 of the housing half-shells 106 and the fastening rib 215. FIG. 4 shows only a non-positive connection 411, wherein the two housing half-shells 106 and the motor support 182 are connected to one another by means of the screw 295 assigned to the screw bosses 235, 435.

Furthermore, FIG. 4 shows the preferably four screw bosses 217, 218, 219, 419 of the motor support 182 for fastening the motor support 182 to the gear unit housing 122.

Figure 5:
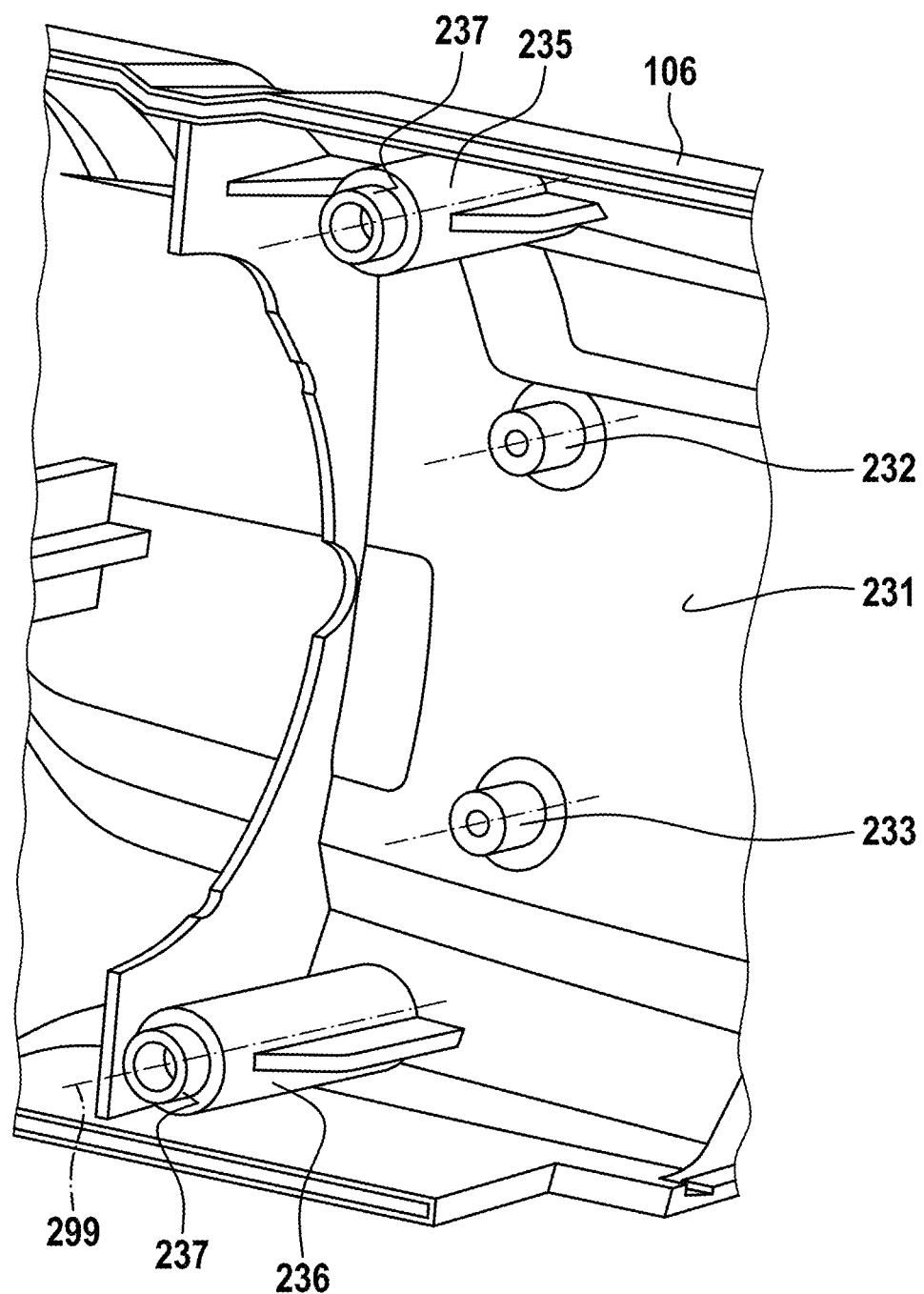
FIG. 5 is a perspective view of a detail of a housing half-shell assigned to the housing of FIG. 1 to FIG. 4.

FIG. 5 shows one of the two housing half-shells 106 of the housing 105 of FIG. 1 to FIG. 4. FIG. 5 here illustrates the arrangement of the at least one, or of the illustratively two, positioning bosses 232, 233 on the inner side 231 of the housing half-shell 105. Furthermore, the arrangement of the at least one, or preferably of the two screw bosses 235, 236 with their relevant pressing surface 237 is shown. Illustratively, the two positioning bosses 232, 233 are arranged between the preferably two screw bosses 235, 236. The fastening axes 299 of the screw bosses 235, 236 and of the positioning bosses 232, 233 are arranged parallel to one another, with only one fastening axis 299 being marked with a reference numeral in FIG. 5.

What is claimed is:

1. A hand-held power tool, comprising:
   a tool holder;
   a housing which has two housing half-shells; and
   a drive unit arranged in the housing and configured to drive the tool holder,
   wherein the drive unit has (i) at least one drive motor arranged in a motor support, and (ii) a gear unit arranged in a gear unit housing,
   wherein the motor support is connected directly to at least one of the two housing half-shells via (i) at least one non-positive connection, and (ii) at least one positive-locking connection,
   wherein a relevant fastening axis is assigned to the at least one non-positive connection and to the at least one positive-locking connection, and
   wherein the fastening axis is arranged at right angles to and at a distance from an axis of rotation assigned to the tool holder, and
   wherein the motor support has an outer surface on which at least one fastening rib arranged along the axis of rotation, the at least one fastening rib including a screw eye formed at right angles to the axis of rotation for the formation of the at least one non-positive connection to the at least one of the two housing half-shells.

2. The hand-held power tool according to claim 1, wherein the outer surface of the motor support has at least one positioning opening formed along the fastening axis for the formation of the at least one positive-locking connection to the at least one of the two housing half-shells.

3. The hand-held power tool according to claim 2, wherein the inner side of the at least one of the two housing half-shells has at least one positioning boss arranged along the fastening axis and assigned to the positioning opening for the formation of the at least one positive-locking connection to the motor support.

4. The hand-held power tool according to claim 1, wherein the motor support is formed in one piece.

5. The hand-held power tool according to claim 1, wherein:
   the outer surface of the motor support has at least two screw bosses oriented along the axis of rotation, and
   the motor support is fastened to the gear unit housing via the at least two screw bosses.

6. The hand-held power tool according to claim 1, wherein an intermediate flange is arranged between the motor support and the gear unit housing.

7. The hand-held power tool according to claim 1, wherein the hand-held power drill is a hammer drill.

8. A hand-held power tool, comprising:
   a tool holder;
   a housing which has two housing half-shells; and
   a drive unit arranged in the housing and configured to drive the tool holder, wherein the drive unit has (i) at least one drive motor arranged in a motor support, and (ii) a gear unit arranged in a gear unit housing,
   wherein the motor support is connected directly to at least one of the two housing half-shells via (i) at least one non-positive connection, and (ii) at least one positive-locking connection,
   wherein a relevant fastening axis is assigned to the at least one non-positive connection and to the at least one positive-locking connection, and
   wherein the fastening axis is arranged at right angles to and at a distance from an axis of rotation assigned to the tool holder,
   wherein the motor support has an outer surface that has at least one fastening rib arranged along the axis of rotation with a screw eye formed at right angles to the axis of rotation for the formation of the at least one non-positive connection to the at least one of the two housing half-shells, and
   wherein the at least one of the two housing half-shells has an inner side facing the motor support that includes at least one screw boss arranged along the fastening axis and assigned to the screw eye for the formation of the at least one non-positive connection to the motor support.

9. The hand-held power tool according to claim 8, wherein the at least one screw boss has a pressing surface against which the fastening rib is applied.

10. The hand-held power tool according to claim 9, wherein:

the two housing half-shells each have at least one screw boss with an associated pressing surface, the screw bosses are configured to be complementary to one another, the motor support is arranged between the two pressing surfaces, and the two housing half-shells and the motor support are connected to one another by way of a screw.

11. The hand-held power tool according to claim 10, wherein the fastening rib is arranged between the two pressing surfaces.

12. The hand-held power tool according to claim 8, wherein the outer surface of the motor support has at least one positioning opening formed along the fastening axis for the formation of the at least one positive-locking connection to the at least one of the two housing half-shells.

13. The hand-held power tool according to claim 12, wherein the inner side of the at least one of the two housing half-shells has at least one positioning boss arranged along the fastening axis and assigned to the positioning opening for the formation of the at least one positive-locking connection to the motor support.

14. The hand-held power tool according to claim 8, wherein the motor support is formed in one piece.

15. The hand-held power tool according to claim 8, wherein:

the outer surface of the motor support has at least two screw bosses oriented along the axis of rotation, and the motor support is fastened to the gear unit housing via the at least two screw bosses.

16. The hand-held power tool according to claim 8, wherein an intermediate flange is arranged between the motor support and the gear unit housing.

17. The hand-held power tool according to claim 8, wherein the hand-held power drill is a hammer drill.

* * * * *